(12) United States Patent
Maro

(10) Patent No.: US 10,258,446 B2
(45) Date of Patent: Apr. 16, 2019

(54) APPARATUS FOR HOLDING OPEN THE MOUTH OF AN ANIMAL WITH ITS JAWS IN A FIXED RELATIONSHIP FOR PERFORMING A MEDICAL OR DENTAL PROCEDURE

(71) Applicant: Peter D. Maro, Darien, CT (US)

(72) Inventor: Peter D. Maro, Darien, CT (US)

( * ) Notice: Subject to any disclaimer, the term of this patent is extended or adjusted under 35 U.S.C. 154(b) by 0 days.

(21) Appl. No.: 14/243,662

(22) Filed: Apr. 2, 2014

(65) Prior Publication Data

US 2015/0282915 A1 Oct. 8, 2015

(51) Int. Cl.
| | | |
|---|---|---|
| *A01K 13/00* | (2006.01) | |
| *A61D 15/00* | (2006.01) | |
| *A01K 15/04* | (2006.01) | |

(52) U.S. Cl.
CPC .............. *A61D 15/00* (2013.01); *A01K 13/00* (2013.01); *A01K 15/04* (2013.01)

(58) Field of Classification Search
CPC .......... A61F 5/566; A61D 5/00; A61D 15/00; A61C 5/007; A61C 5/12; A61C 5/122; A61C 5/125; A61C 9/0006; A61C 9/0013
USPC ................. 433/1, 37, 140; 606/204; 602/60; 128/848, 878–880; 119/821, 831, 833
See application file for complete search history.

(56) References Cited

U.S. PATENT DOCUMENTS

| | | | | |
|---|---|---|---|---|
| 953,437 | A * | 3/1910 | Rexicker ................ | A01K 25/00 119/831 |
| 2,056,493 | A * | 10/1936 | Streever ................. | A01K 25/00 119/831 |
| 2,982,249 | A * | 5/1961 | Smith ..................... | A01K 25/00 119/831 |
| 4,432,728 | A * | 2/1984 | Skarky ................. | A61C 9/0006 433/37 |
| 4,694,544 | A * | 9/1987 | Chapman .............. | F16B 21/065 24/625 |
| 5,038,717 | A * | 8/1991 | Bent ...................... | A01K 15/02 119/815 |
| 5,918,377 | A * | 7/1999 | Ulrich .................... | A01K 13/00 33/511 |
| D468,490 | S * | 1/2003 | Childs ......................... | D30/136 |
| 7,421,794 | B2 * | 9/2008 | Newell .................. | A01K 29/00 33/511 |
| 2011/0086321 | A1* | 4/2011 | Finnegan ............. | A01K 15/026 433/1 |
| 2012/0279459 | A1* | 11/2012 | Angle .................. | A01K 15/026 119/707 |

* cited by examiner

*Primary Examiner* — Zade Coley
*Assistant Examiner* — Jessica Weiss
(74) *Attorney, Agent, or Firm* — St. Onge Steward Johnston & Reens LLC

(57) ABSTRACT

Apparatus for spacing apart the jaws of an animal, such as a canine, in a fixed relationship during the performance of a medical or dental procedure. The apparatus includes a bite member for spacing apart the teeth of an animal, a strap adapted to be wound around the snout of the animal for confining the snout and a strap connector with the strap connector having one end thereof adapted for attachment to the strap and another end for holding the jaws in relatively tight engagement against the bite member after the strap is wound around the snout.

20 Claims, 4 Drawing Sheets

APPARATUS FOR HOLDING OPEN THE MOUTH OF AN ANIMAL WITH ITS JAWS IN A FIXED RELATIONSHIP FOR PERFORMING A MEDICAL OR DENTAL PROCEDURE

FIELD OF THE INVENTION

The present invention relates to apparatus for holding open the mouth of an animal with its jaws in a fixed relationship for performing a medical or dental procedure.

BACKGROUND OF THE INVENTION

A mouth prep or bite block has previously been used by dentists or veterinarians to space apart the lower jaw (mandible) from the upper jaw (maxilla) for performing a dental or medical procedure. Use of a prop or bite block holds the mouth open but has substantial limitations in that it does not maintain the upper and lower jaws in a fixed relationship. A conventional mouth prep and bite block permits the animal to further open up its mouth and reposition the bite block during the medical or dental procedure or possibly expel the bite block entirely from the mouth. A conventional muzzle will restrain the mouth of the animal but does not provide adequate access and/or exposure of the teeth in the mouth to perform a dental or medical procedure. For example, when cleaning teeth, the lower and upper teeth must be adequately spaced apart and the teeth must be exposed at the gumline where tartar forms.

The apparatus of the present invention not only holds the mouth of an animal open but establishes a fixed spacial relationship between the upper and lower jaws for performing a medical or dental procedure. Moreover, the apparatus of the subject invention permits the spacing between the upper and lower jaws to be adjusted to accommodate different size animal mouths.

SUMMARY OF THE INVENTION

The apparatus of the subject invention comprises a bite member for spacing apart the teeth of an animal, a strap adapted to be wound around the snout of the animal for confining the snout and a strap connector with the strap connector having one end thereof adapted for attachment to the strap and another end in removable engagement to the bite member. The strap preferably includes a Velcro® type hook-and-loop touch fastener for securing one end of the strap to the strap connector and for allowing the strap to be wound around the snout and affixed at the opposite end thereof for securing the strap in relatively tight engagement wound about the snout of the animal. The Velcro® type hook-and-loop touch fastener may be located at opposite ends of the strap or may extend from end to end on one or both sides of the strap.

The bite member is a body of any desired geometry composed preferably of rubber or silicone rubber and of a size adapted for placement between the animal's upper and lower teeth to hold open the mouth of the animal. Although rubber or silicone rubber is preferred, the bite member may be of any other material composition including wood, relatively hard plastic and foam.

The bite member should preferably have an elongated body of a length sufficient to longitudinally extend from opposite sides of the mouth of the animal. The bite member body geometry is preferably cylindrical but may be rectangular and should include a plurality of protuberances which extend outwardly from the body to form, in cross section, an undulating geometry so that the bite member will vary in height based on its rotational orientation. Four protuberances is preferred, forming a clover leaf type pattern.

The bite member is preferably detachably connected to the strap connector. In the preferred embodiment, the bite member has a male protuberance of elastic material extending from one end of its body for removable attachment to a female coupling in the strap connector. The strap connector is a fixture in an open geometry with one side having the female coupling for engaging the male protuberance of the bite member and having on another side thereof a bar to which the strap member is attached.

The bite member may also include a plurality of grooves formed at one end thereof with the grooves spaced apart at preferably equal distances to form removable sections of the bite member. The plurality of grooves facilitate the removal of one or more of the sections of the bite member by cutting off one or more of the grooves, which reduces the length of the biting member to approximately the width of the snout of the animal being treated.

DETAILED DESCRIPTION OF A PREFERRED EMBODIMENT

Figure 6:
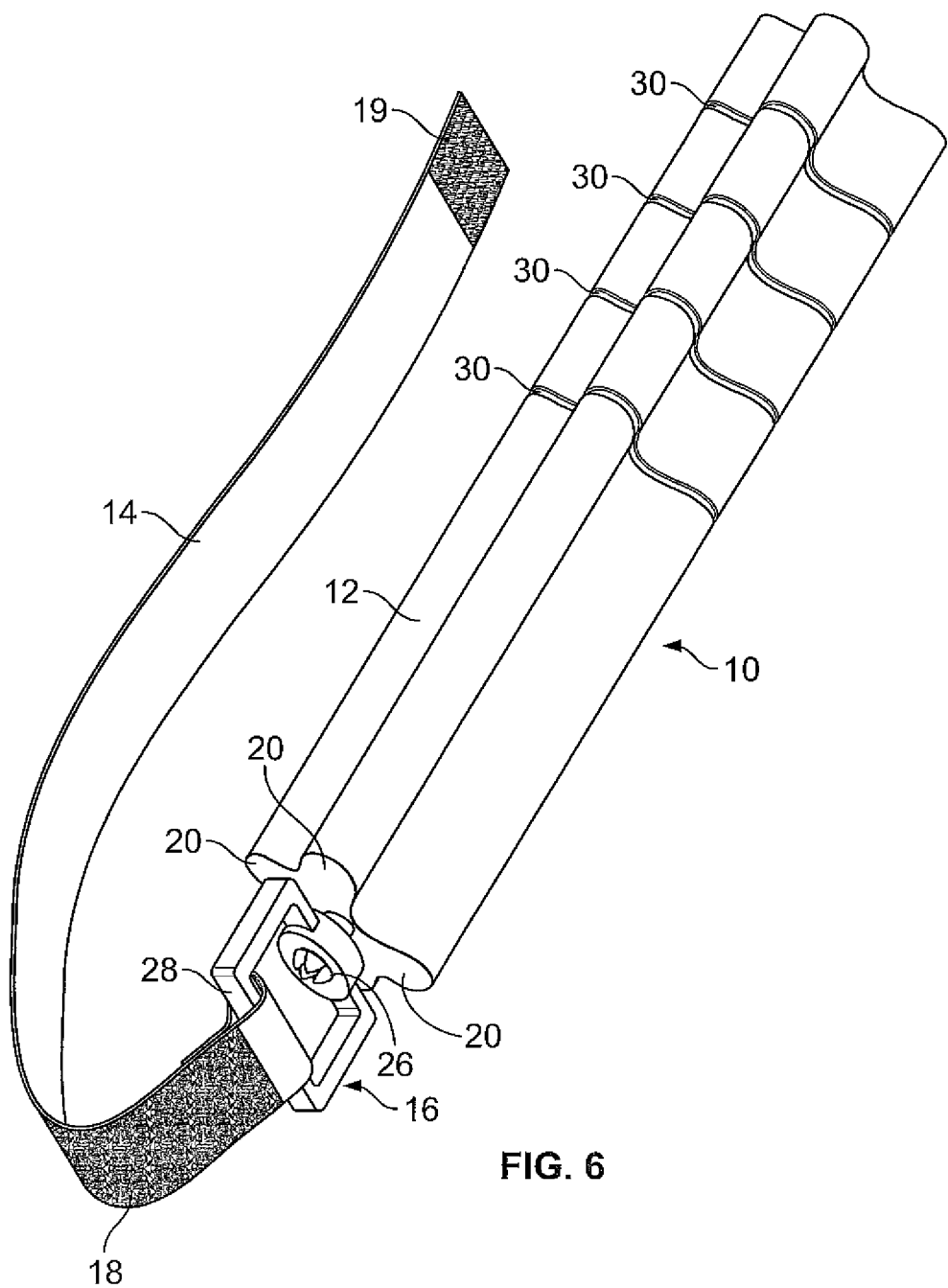
FIG. 6 is a perspective view of the apparatus of the subject invention.

The apparatus 10 of the subject invention is shown in FIG. 6 and comprises a bite member 12, a strap 14 and a strap connector 16. FIGS. 1-4 show the apparatus of the invention partially assembled about the snout of a canine. The strap 14 is intended to be wound around the snout after the bite member 12 is placed in the mouth to confine the snout in relatively tight engagement against the bite member 12 for establishing a fixed spacial relationship between the upper and lower jaws throughout a medical or dental procedure.

The bite member 12 is preferably inserted into the mouth of the animal to lie transverse to the snout of the animal and preferably behind and adjacent to the canine teeth in the lower jaw and the incisor teeth in the upper jaw, i.e., between the incisors and the molar camassial teeth but closer to and preferably adjacent the incisor teeth. This provides the greatest degree of freedom for the Dentist or Veterinarian to perform a procedure such as cleaning. By locating the biting member 12 near the front teeth particularly adjacent the incisors opens the back portion of the mouth to allow access to the gumline where tartar forms. The bite member 12 is preferably detachably connected to the strap 14.

Figure 5:
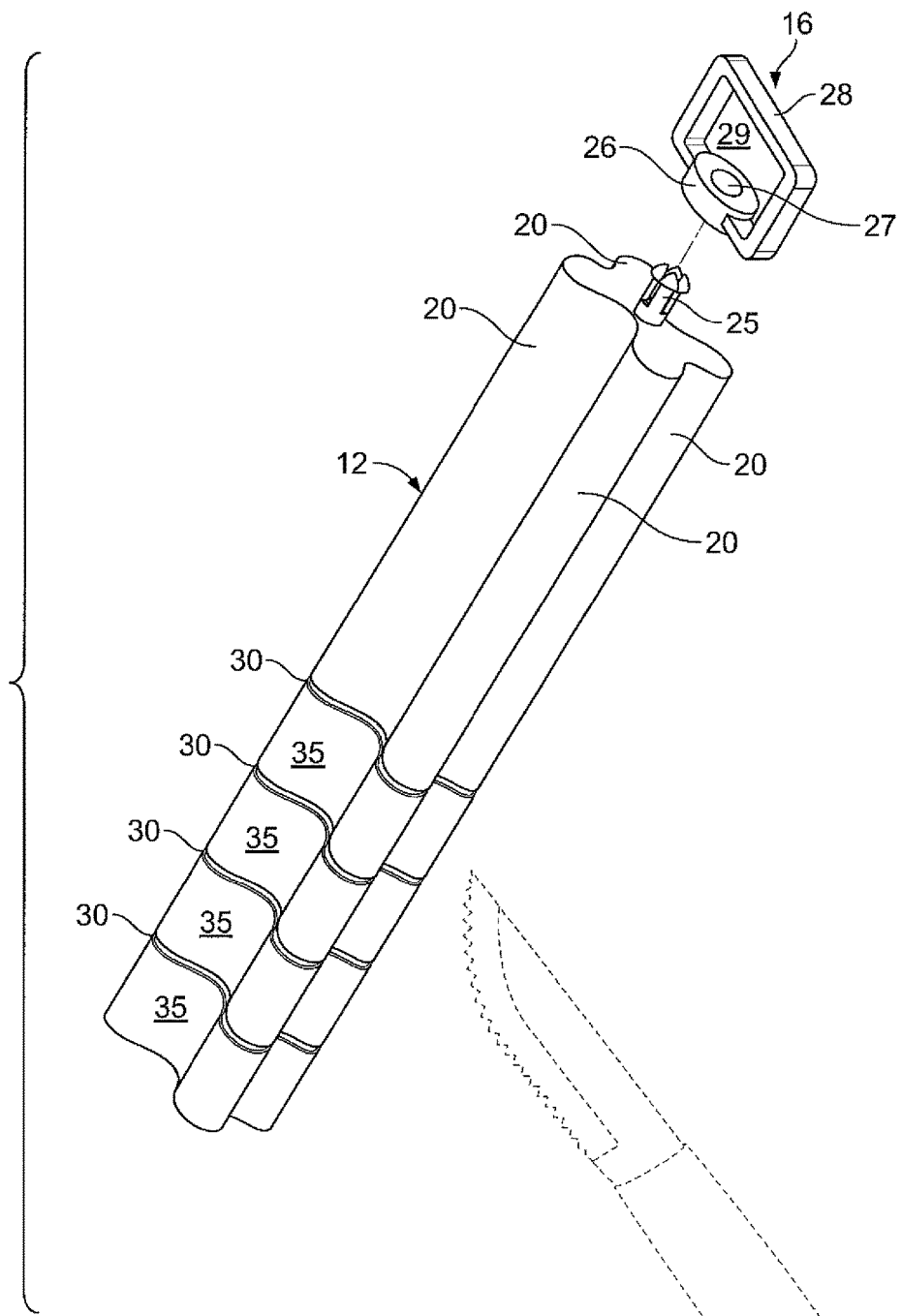
FIG. 5 is an exploded view in perspective of the bite member and strap connector of the apparatus of the subject invention with the strap connector shown detached from the bite member and with a cutting utensil, in phantom, for use in cutting off sections of length of the bite member to accommodate different size canines.

In the preferred embodiment as shown in FIGS. 5 and 6 the bite member 12 is a body preferably composed of rubber or silicone rubber and of a size adapted for placement between the animals upper and lower teeth to hold open the mouth of the animal. Although rubber or silicone rubber is preferred the bite member may be of any other material composition including wood, relatively hard plastic and foam.

Figure 1:
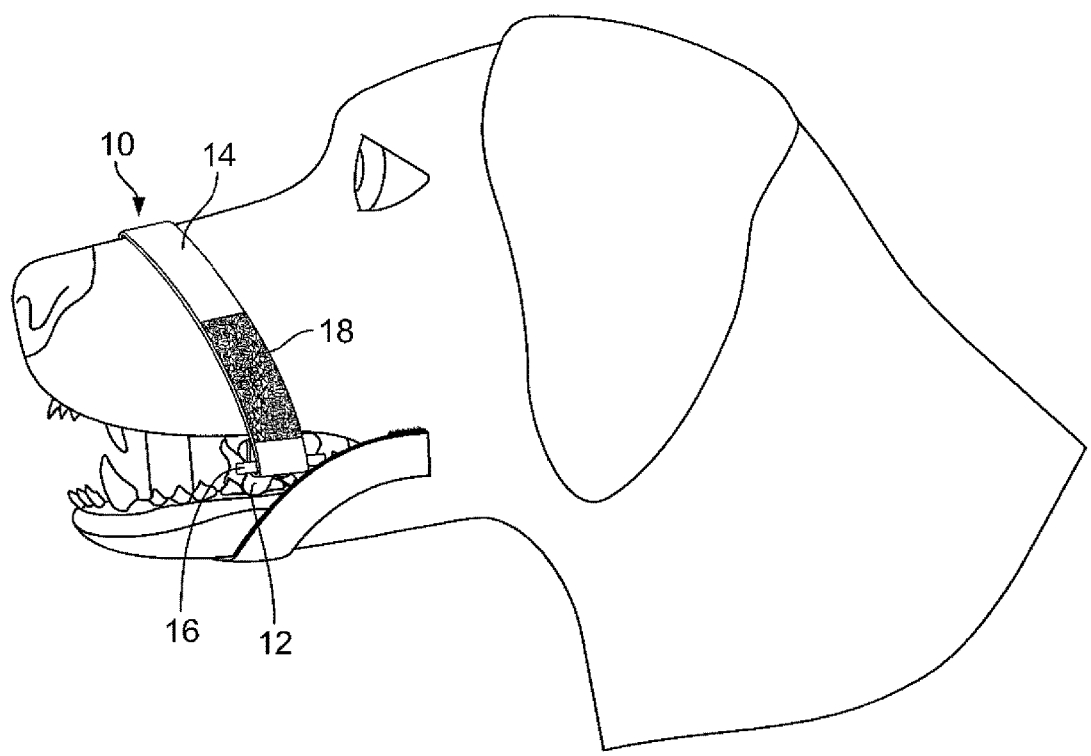
FIG. 1 is a side elevational view of a canine with the apparatus of the subject invention shown partially assembled about the snout of the canine.
Figure 2:
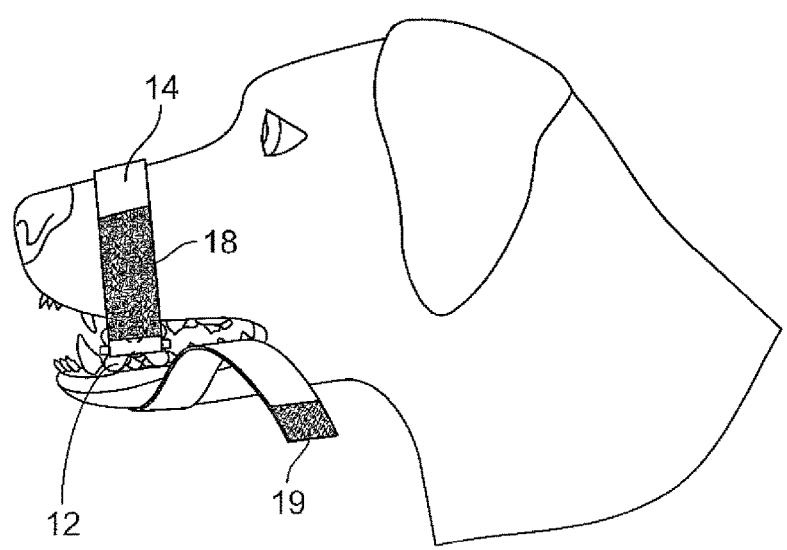
FIG. 2 is another side elevational view similar to FIG. 1 with the apparatus of the subject invention shown partially assembled and with the bite member oriented within the mouth of the canine to provide a first controlled spacing between the teeth.
Figure 3:
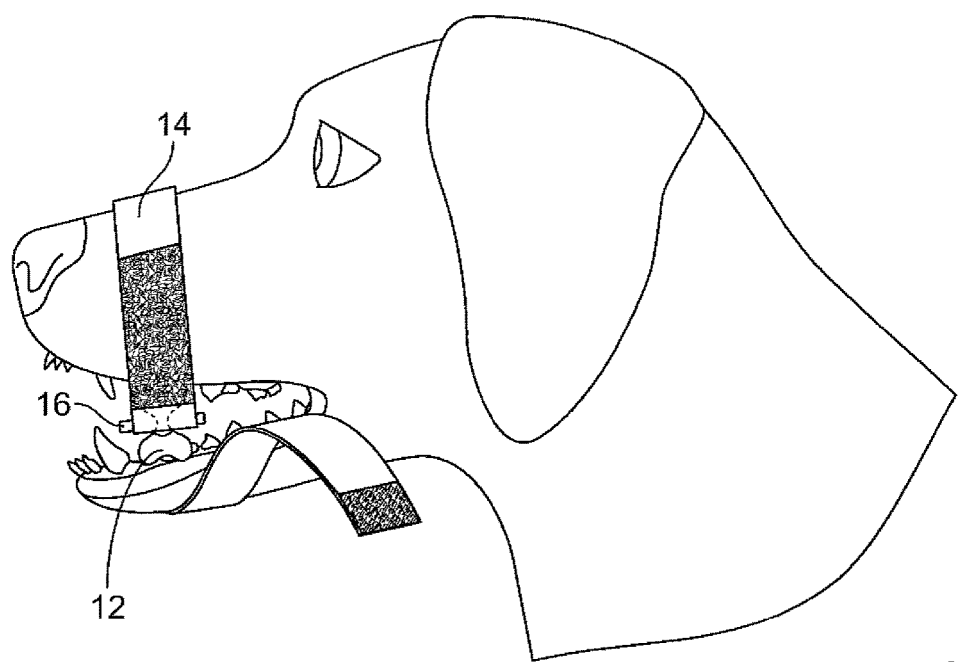
FIG. 3 is yet another side elevational view similar to FIG. 2 with the apparatus of the subject invention shown partially assembled and with the bite member oriented in a position oriented about 90° from the orientation shown in FIG. 2 to provide a second controlled spacing between the teeth.
Figure 4:
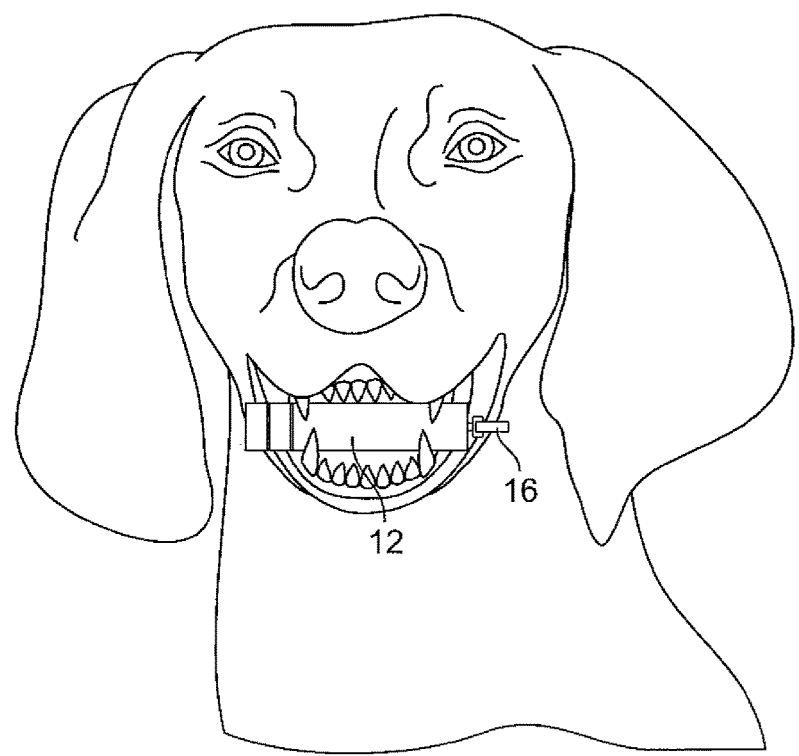
FIG. 4 is a front view of the canine shown in FIG. 1 showing the preferred placement of the bite member of the apparatus of the subject invention extending lengthwise between opposite sides of the mouth and adjacent to the canine and incisor teeth of the canine.

Although the body of the biting member 12 may have any desired geometry a cylindrical or rectangular geometry is preferred and more particularly having a plurality of undulating protuberances 20 which project from the body of the biting member 12 and preferably form, in cross section, a clover leaf pattern. Each of the undulating protuberances 20 have essentially the same dimensions so that the bite member 12 will vary in height based on its rotational orientation. Accordingly, when the bite member 12 is placed into the mouth of the canine as shown in FIG. 1 the bite member 12 lies in a first position in which the spacing between the upper and lower jaws are fixed at a first controlled spacing. In this position the protuberances 20 extend longitudinally from their opposite ends in the mouth of the canine. However, in FIG. 3 the bite member 12 is shown rotated about 90 degrees from the position shown in FIGS. 1 and 2 representing a second controlled spacing of the teeth which is larger than the spacing created between the teeth in the first position. In the second position the protuberances 20 are vertically oriented relative to the first position in the mouth of the canine. Stated otherwise, the plurality of protuberances 20 give the bite member 12 in one orientation representing the first position a longer width and a shorter height and creates a smaller opening between the upper and lower teeth than when oriented in the second position which results in a longer height enlarging the opening between the teeth. For small and medium size dogs, for example, the biting member 12 should be oriented in the dog's mouth in the first position whereas for larger dogs the biting member 12 should be oriented in the dog's mouth in the second position which involves a rotation of the biting member 12 of ninety degrees.

The bite member 12 is preferably detachably connected to the strap connector 16. The bite member 12 has a male protuberance 25 of elastic material extending from one end of its body for removable attachment to a female coupling 26 in the strap connector 16. The strap connector 16 is a fixture having an open geometry, preferably rectangular in configuration, with a female coupling 26 at one end having an opening 27 therein for engaging the male protuberance 25 of the bite member 12 and having a bar 28 on an opposite side about which the strap member 14 is attached.

The strap 14 is composed of a flexible relatively elastic material preferably having a conventional Velcro® type hook-and-loop touch fastener 18 at one end thereof on both sides for attachment to the bar 28 of the strap connector 16 by inserting the strap 14 through the central opening 29 of the strap connector 16 and folding over the end to attach the Velcro® type hook-and-loop touch fastener 18 on both sides of the strap 14. The strap 14 is then wound around the snout of the canine until the jaws of the canine are held in relatively tight engagement against the bite member 12 with the section of Velcro® type hook-and-loop touch fastener 19 at the opposite end of the strap 14 affixed to the Velcro® type hook-and-loop touch fastener 18 at the end of the strap engaging the strap connector 16. The Velcro® type hook-and-loop touch fastener may alternatively be placed on both opposite sides of the strap 14 from end to end.

The bite member 12 preferably also includes a plurality of grooves 30 which are spaced apart at preferably equal distances to form removable sections 35 between the grooves 30 of the bite member. The individual grooves 30 are essentially identical to one another and facilitate the removal of one or more of the sections 35 of the bite member 12 by cutting through one or more of the groves 30, using a cutting utensil such as a knife as shown in phantom in FIG. 5, for removing one or more sections 35 of the bite member 12 in order to reduce the length of the biting member until the bite member 12 has a length which when placed in the mouth of the canine extending transversely between the opposite sides of the mouth of the canine approximates the width of the snout of the canine being treated.

What is claimed is:

1. Apparatus for spacing apart the upper and lower jaws of a canine and for holding the spaced apart jaws in a fixed relationship during the performance of a medical or dental procedure comprising:

a bite member for placement in the mouth of the canine to space apart the teeth in the upper jaw from the teeth in the lower jaw;

a strap adapted to be wound around the snout of the canine and a strap connector adapted for attachment to the strap and having a coupling in detachable engagement to the bite member such that when the strap is wound around the snout the strap holds the jaws in relatively tight engagement against the bite member;

the bite member having an elongated body extending from opposite sides of the mouth of the canine and a plurality of undulating protuberances which extend outwardly from the body to form, in cross section, an undulating geometry so that the bite member will vary in height based upon the rotational orientation of the bite member such that the spacing in the opening of the canine mouth between the teeth in the upper jaw and the teeth in the lower jaw varies from a small to a large spacing in response to an angular oriented rotation of the bite member of up to ninety degrees in the canine mouth;

the bite member having a protuberance for detachable engagement into an opening in the coupling of the strap connector;

the strap having only one end thereof connected to the strap connector in an arrangement so that the opposite end of the strap can be wound around the snout of the canine after the bite member is oriented into a desired rotational position in the mouth of the canine so that the mouth of the canine is held open with the upper and lower teeth held in a fixed spatial relationship to one another;

the bite member being operable to be placed between the incisors and the molar camassial teeth in close engagement adjacent the incisors;

the strap having a fastening strip at least at each end thereof for attaching opposite ends of the strap after winding the strap around the snout of the canine;

the bite member being composed of a material selected from the group consisting of: rubber, silicone rubber, wood, plastic and foam;

the protuberance being flexible and malleable to be easily inserted into the opening of the coupling of said strap connector; and the strap connector having a central opening with the coupling located at one end of the strap connector for removably coupling to the flexible protuberance of the bite member.

2. Apparatus as defined in claim 1 wherein the strap connector further comprises a bar at an end opposite the coupling and one end of the strap is connected to the bar.

3. Apparatus for spacing apart the upper and lower jaws of a canine and for holding the spaced apart jaws in a fixed relationship during the performance of a medical or dental procedure comprising:

a bite member for placement in the mouth of the canine to space apart the teeth in the upper jaw from the teeth in the lower jaw;

a strap adapted to be wound around the snout of the canine and a strap connector adapted for attachment to the strap and having a coupling in detachable engagement to the bite member such that when the strap is wound around the snout the strap holds the jaws in relatively tight engagement against the bite member;

the bite member having an elongated body extending from opposite sides of the mouth of the canine and a plurality of undulating protuberances which extend outwardly from the body to form, in cross section, an undulating geometry so that the bite member will vary in height based upon the rotational orientation of the bite member such that the spacing in the opening of the canine mouth between the teeth in the upper jaw and the teeth in the lower jaw varies from a small to a large spacing in response to an angular oriented rotation of the bite member of up to ninety degrees in the canine mouth;

the bite member having a protuberance for detachable engagement into an opening in the coupling of the strap connector;

the strap having only one end thereof connected to the strap connector in an arrangement so that the opposite end of the strap can be wound around the snout of the canine after the bite member is oriented into a desired rotational position in the mouth of the canine so that the mouth of the canine is held open with the upper and lower teeth held in a fixed spatial relationship with respect to one another;

the bite member being operable to be placed between the incisors and the molar camassial teeth in close engagement adjacent the incisors;

the strap having a fastening strip at least at each end thereof for attaching opposite ends of the strap after winding the strap around the snout of the canine;

the bite member being composed of a material selected from the group consisting of: rubber, silicone rubber, wood, plastic and foam;

the protuberance being flexible and malleable to be easily inserted into the opening of the coupling of the strap connector;

the body of the bite member having a cylindrical or rectangular geometry; and the bite member further comprises a plurality of grooves spaced apart to form removable sections between the grooves of the bite member.

4. Apparatus as defined in claim 3 wherein the grooves are spaced at equal distances apart from one another with the grooves facilitating the removal of one or more of the sections of the bite member by cutting through one or more of the grooves.

5. Apparatus for spacing apart the upper and lower jaws of a canine and for holding the spaced apart jaws in a fixed relationship during the performance of a medical or dental procedure comprising:

a bite member for placement in the mouth of the canine to space apart the teeth in the upper jaw from the teeth in the lower jaw;

the bite member having first and second ends, having an elongated body along a longitudinal axis, and being adapted to be disposed in the mouth of the canine with the longitudinal axis transverse to the snout and the bite member extending from opposite sides of the mouth of the canine;

a strap having a first end connected to the first end of the bite member, having a second end which is a free end, and having an intermediate portion between the first and second ends;

the strap having a first side and a second side, having a first portion of a touch fastener disposed on the first side of the strap, and having a second portion of the touch fastener disposed on the second side of the strap, where the first and second portions of the touch fastener are adapted to releasably join together;

the strap being operable to be wound around the snout of the canine after the bite member is placed in the mouth of the canine such that the strap wraps around both the upper and lower jaws of the canine; and when the strap is wound around the snout of the canine, the second end of the strap is operable to releasably connect to the intermediate portion of the strap with the second portion of the touch fastener on the second side of the strap engaged with the first portion of the touch fastener on the first side of the strap whereby the mouth of the canine is held open with the upper and lower jaws held in a fixed spatial relationship with respect to one another.

6. Apparatus as defined in claim 5 wherein:

a first orientation of the bite member within the mouth of the canine forms a first position of the bite member between the upper and lower teeth and a second orientation of the bite member rotated 90 degrees from the first orientation about the longitudinal axis forms a second position of the bite member between the upper and lower teeth in which the opening between the teeth is larger than the opening formed in the first position;

the first end of the strap is connected to the first end of the bite member by a strap connector; and the bite member is operable to rotate relative to the strap connector and strap during rotation of the bite member between the first and second orientations;

whereby a rotational orientation of the strap connector and strap can remain the same in both rotational orientations of the bite member.

7. Apparatus as defined in claim 6 wherein:

the bite member has a protuberance extending from the first end thereof, and the strap connector has a coupling adapted to rotatably receive the protuberance, and the protuberance is rotatably engaged with the coupling; and the strap connector has a bar disposed opposite the coupling and the first end of the strap is connected to the bar.

8. Apparatus as defined in claim 6 wherein:
the bite member has a plurality of undulating protuberances which extend outwardly from the body to form, in cross section, an undulating geometry so that the bite member will vary in height based upon the rotational orientation of the bite member such that the spacing in the opening of the canine mouth between the teeth in the upper jaw and the teeth in the lower jaw varies from a small to a large spacing in response to an angular oriented rotation of the bite member of up to ninety degrees in the canine mouth.

9. Apparatus as defined in claim 5 wherein:
the bite member has a plurality of grooves spaced apart along the longitudinal axis forming removable sections of the bite member.

10. Apparatus as defined in claim 5 wherein the touch fastener is a hook and loop touch fastener.

11. Apparatus as defined in claim 5 wherein the bite member is adapted to be placed between the incisors and the molar camassial teeth in close engagement adjacent the incisors.

12. Apparatus as defined in claim 11 wherein the strap has a fastening strip at least at each end thereof for attaching opposite ends of the strap after winding the strap around the snout of the canine.

13. Apparatus as defined in claim 5 wherein the bite member is composed of a material selected from the group consisting of: rubber, silicone rubber, wood, plastic and foam.

14. Apparatus as defined in claim 7 wherein the protuberance is flexible and malleable to be easily inserted into the coupling of said strap connector.

15. Apparatus as defined in claim 14 wherein the strap connector has a central opening with said coupling located at one end of the strap connector for removably coupling to the flexible protuberance of the bite member.

16. Apparatus as defined in claim 15 wherein the strap connector further comprises a bar at an end opposite the coupling with the fastening strip at one end of the strap connected to the bar.

17. Apparatus as defined in claim 5 wherein the body of said bite member is of cylindrical or rectangular geometry.

18. Apparatus as defined in claim 17 wherein the height of the undulating protuberances of the bite member in the mouth of the canine and the angular oriented rotational position of the bite member controls the spacing between the upper and lower jaws of the canine.

19. Apparatus as defined in claim 8 wherein the bite member further comprises a plurality of grooves spaced apart to form removable sections between the grooves of the bite member.

20. Apparatus as defined in claim 19 wherein the grooves are spaced at equal distances apart from one another with the grooves facilitating the removal of one or more of the sections of the bite member by cutting through one or more of the grooves.

* * * * *